Patented May 2, 1933

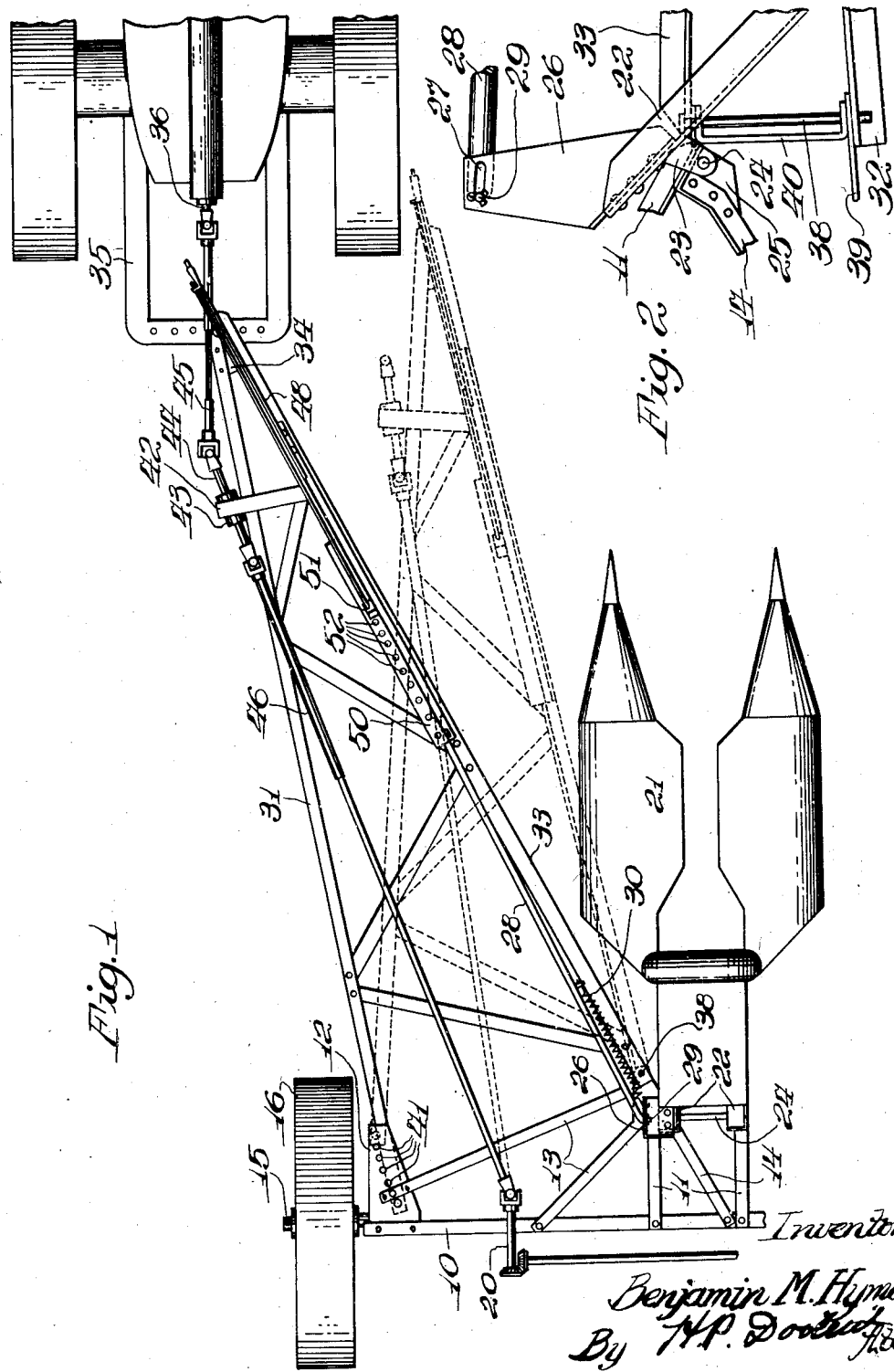

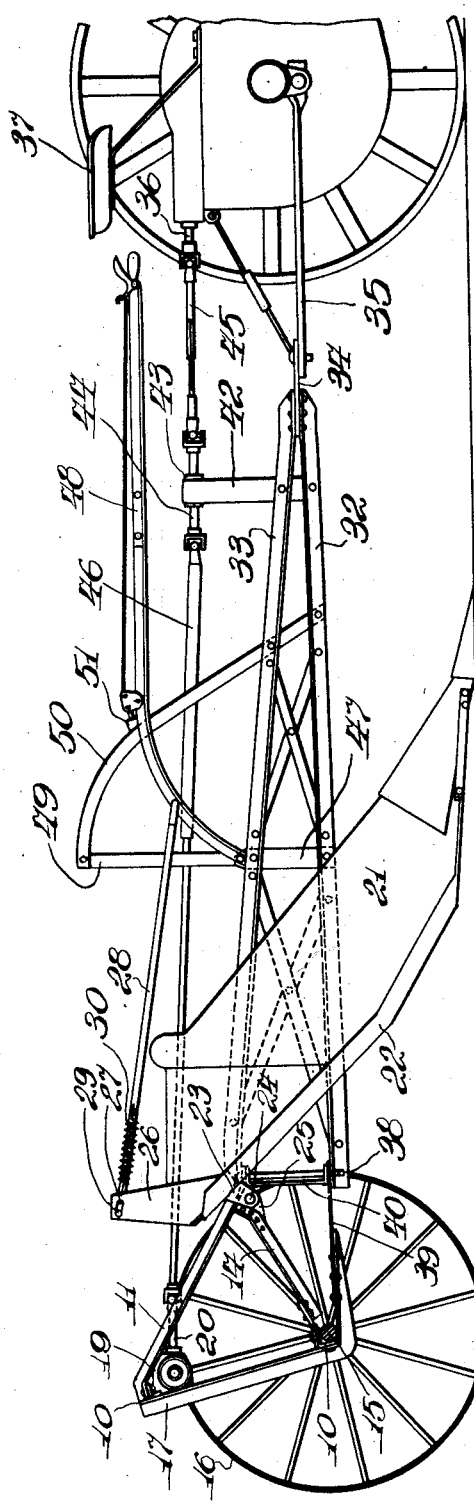
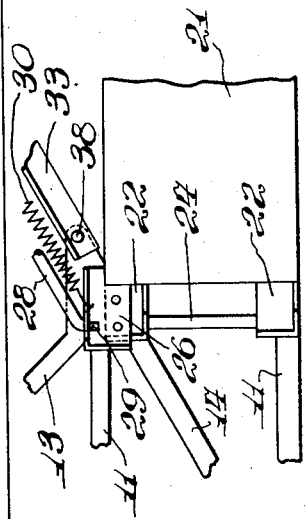

1,906,606

UNITED STATES PATENT OFFICE

BENJAMIN M. HYMAN, OF CHICAGO, ILLINOIS, ASSIGNOR TO INTERNATIONAL HARVESTER COMPANY, A CORPORATION OF NEW JERSEY

ADJUSTABLE OFFSET HITCH

Application filed June 23, 1932. Serial No. 618,906.

This invention relates to a hitch for agricultural implements and the like.

More particularly it relates to a hitch or draft device for two-wheeled implement frames to be drawn by a tractor in laterally offset relation thereto.

The principal object of the invention is to provide in combination with a hitch or draft frame, constructed for lateral adjustment, means for adjusting the angular position of a frame constituting a part of the implement.

Another object is to so mount the angular adjusting means on the hitch or draft frame that it is not affected by lateral adjustment of said frame and will at all times be within reach of the tractor operator.

These and other objects, which will be apparent from the detailed description to follow, are accomplished by a construction such as shown in the drawings, in which:

Figure 1 is a plan view showing portions of a corn picker and a tractor, and a hitch or draft frame connecting the two, which embodies the invention, the draft frame being shown in dotted lines in an adjusted position;

Figure 2 is an enlarged detail in elevation, showing the pivotal connection between the supplemental frame, which carries the snapping unit of the picker on the main frame of the implement;

Figure 3 is an elevation of the same construction shown in Figure 1; and,

Figure 4 is an enlarged detail in plan, showing the pivotal connection between the snapping unit carried by the supplemental frame on the main frame.

The device as shown may be considered as consisting of certain units practically complete in themselves. The main frame of the implement, the supplemental frame pivotally mounted thereon for angular adjustment with respect thereto, and the draft frame connected to the main frame for lateral adjustment with respect thereto are essential units of the device. Only a portion of the main frame of the implement, which is built up of a plurality of angle bars, is shown. Said frame includes vertically spaced, transverse bars 10, a plurality of forwardly extending bars 11, a forwardly extending plate 12, and bracing bars 13 and 14. An axle 15, secured to the corner of the frame adjacent the plate 12, rotatably supports a wheel 16. It is to be understood that the main frame carries another similar wheel in axial alignment with the wheel 16.

As shown in Figure 3, an upwardly extending bar 17, rigidly secured to the bars 10, and one of the upwardly and rearwardly extending bars 11 form part of a means for supporting a gear casing 19. A shaft 20 extends forwardly from said casing and forms a part of a sectional drive shaft adapted to be operated by the tractor for actuating the mechanism of an implement such as a corn picker. It is to be understood that the mechanism, which may be mounted on the main frame, depends upon the implement being used, and has not been shown, as it does not form a part of the present invention.

The snapping unit 21 of the corn picker is mounted on a supplemental frame which includes spaced forwardly and downwardly extending angle bars 22. Said bars at their upper ends are connected to downwardly projecting ears 23. Said ears are provided with aligned openings through which a pivot pin 24 rotatably extends. Said pin also extends through aligned openings formed in gusset plates 25 carried on the main frame and in part by the bars 11 and 14. This mounting provides a transverse axis on which the supplemental frame is pivotally supported on the main frame for angular movement with respect thereto. An upwardly extending bracket 26, secured to one of the bars 22 of the supplemental frame, is provided at its upper end with a longitudinally extending slot 27. A forwardly extending link 28 is slidably mounted in said slot by a pin 29. A spring 30, connected to the bracket and to a forward point on the link, acts to resiliently maintain the pin 29 at the rear of the slot 27. The link 28 serves as means for tipping the supplemental frame, as will be hereinafter described.

The hitch or draft frame of the device consists of three forwardly extending bars 31, 32 and 33, rigidly secured together by a plurality of diagonally extending brace bars. The bars 31 and 32 are arranged in a horizontal plane. The rear ends of said bars are connected to spaced points on the implement frame and the forward ends are brought together. The bars 32 and 33 are arranged in a substantially vertical plane with the rear ends thereof spaced apart and the forward ends brought together. All three of said bars, at their forward ends, are rigidly secured to a member or plate 34, which is pivotally mounted on the drawbar 35 of a tractor. Said tractor is of a conventional construction, the drawbar extending rearwardly there-behind being supported in horizontal position and adapted to carry the weight of an unbalanced frame implement, as illustrated. The tractor is provided with a rearwardly extending power take-off shaft 36. The driver's seat 37 is also shown.

At their rear ends the bars 32 and 33 are provided with vertically aligned openings through which a pin 38 extends. Said pin also extends through aligned openings formed in a horizontal extension of one of the angle bars 11 of the frame structure and in a plate 39 of the frame structure, which is rigidly secured to a forwardly extending part of the bar 17. A spacer member 40 is positioned between the plate 39 and the end of the bar 11 to hold said elements in vertically spaced positions, thereby providing a substantial support for the rear of the draft frame.

The bar 31 is mounted under the plate 12 so that it may slide with respect to said plate when the frame is pivoted on the vertical axis provided by the pin 38 and the associated parts. The end of the bar 31 is provided with an opening, and a plurality of openings 41 are provided in the plate 12, said openings being on a radius described about the pivot pin 38 whereby the opening in the end of the bar 31 may be brought into alignment with any one of the openings 41, with the hitch frame in a plurality of angular positions. A suitable bolt is used for rigidly securing the bar 31 to the plate 12 in any one of the adjusted positions.

Near the forward end of the draft frame a support 42, secured to the bars 32 and 33, extends upwardly to a height substantially in vertical alignment with the tractor power take-off and also laterally toward the center line of the tractor. Said support carries a journal 43, in which a shaft 44 is rotatably mounted. Said shaft is connected by universal joints to a forwardly directed extensible shaft 45 and a rearwardly directed, extensible shaft 46. The shaft 45 is connected by a universal joint to the power take-off shaft 36 of the tractor. The shaft 46 is connected by a universal joint to the shaft 20 mounted on the main frame of the implement, as previously described. Said shafts and the connections between them constitute a sectional, extensible drive shaft for the mechanism of the implement.

A substantially vertically positioned bar 47, secured to the bars 32 and 33 substantially centrally thereof, forms a support on which an adjusting lever 48 is pivotally mounted on a transverse axis. An upward extension 49 of the bar 47 is connected to a particularly shaped bar 50. Said bar has an upper portion curved about a constant radius from the pivot point of the lever 48 on the bar 47. The lower portion of the bar 50 extends diagonally forwardly and is rigidly connected to the bars 32 and 33. The tilting lever 48 extends to a position within reach of the operator's seat 37. A latch 51, operable from the forward end of the tilting lever, may be selectively engaged in a plurality of openings 52 formed in the arcuate portion of the bar 50. The link 28, previously described, is pivotally connected to the lever 48 above its pivot point.

In operating an implement as above described, the hitch or draft frame is ordinarily secured in the dotted position shown in Figure 1 for transporting the machine. This enables the machine to be pulled through gates of the ordinary width and along highways. In the field it is necessary to offset the machine with respect to the tractor. This is accomplished by removing the bolt which secures the bar 31 of the draft frame to the plate 12 on the main frame. The hitch frame may then be swung outwardly to the desired offset position. The member 31 is then again secured to the plate 12. It will be noted that although the power take-off shaft is mounted on the draft frame, it is not necessary to in any way disconnect or adjust the shaft, as the extensible shafts 45 and 46 provided therein automatically take care of the lateral shifting movement.

In machines of the type illustrated it is necessary to have some means for tilting the implement with respect to the draft frame, as the position of the draft frame is substantially uniform on the tractor drawbar. In the construction illustrated, this angular adjustment is provided by mounting a supplemental frame on the main frame of the implement, said supplemental frame carrying the portion of the implement which must be adjusted, that is, in the machine shown, the gathering and snapping unit. By mounting the adjusting lever 48 on the draft frame, it may be extended to a position within reach of the operator. The link 28 transmits the angular movement of the supplemental frame. The slot 27 and the spring 30 are provided to resiliently hold the supplemental frame in position, permitting its tilting in an upward direction when obstructions are encountered along the ground. It will be noted that the pivot axis of the link 28 on the bracket 27 is substantially in vertical alignment with the axis of attachment of the draft frame on the pin 38. This arrangement was designed so that angular adjustment of the draft frame would interfere only slightly with the tilting lever connections and the linkage associated therewith. The connection of the link 28 with the bracket 26 is loose enough to permit the change in angularity with respect thereto brought about by adjusting the draft frame. With this construction, therefore, the adjusting linkage need not be interfered with in any way when adjusting the draft frame laterally. This is an important feature of the present invention.

It is to be understood that applicant has shown and described only one preferred embodiment of his improved implement hitch and that he claims as his invention all modifications falling within the scope of the appended claims.

What is claimed is:

1. An implement hitch comprising, in combination with a single axle wheel-supported implement, a draft frame secured to the implement for lateral adjustment with respect thereto about a substantially vertical axis, and means for tilting the implement about a transverse axis with respect to the draft frame, said means including a linkage mounted on the draft frame and movable therewith.

2. An implement hitch comprising, in combination with a single axle wheel-supported implement, a draft frame secured to the implement for lateral adjustment with respect thereto about a substantially vertical axis, and a linkage mounted on the draft frame and movable therewith and connected to the implement for tilting said implement about a transverse axis with respect to the draft frame.

3. An implement hitch comprising, in combination with a single axle wheel-supported implement, a draft frame secured to the implement for lateral adjustment with respect thereto about a substantially vertical axis, said frame being pivotally connected to a tractor, and a linkage mounted on the draft frame and movable therewith and connected to the implement for tilting said implement about a transverse axis with respect to the draft frame, said linkage including a manually operable lever extending within operating range of the driver's seat on the tractor.

4. An implement hitch comprising, in combination with a single axle wheel-supported implement, a draft frame secured to the implement for lateral adjustment with respect thereto about a substantially vertical axis, and a linkage mounted on the draft frame and movable therewith and connected to the implement for tilting said implement about a transverse axis with respect to the draft frame, said linkage including a link pivoted to the implement at a point substantially in vertical alignment with the axis of the adjustment of the draft frame.

5. An implement hitch comprising, in combination with a tractor drawbar and a single axle wheel-supported implement, and in combination therewith a draft frame secured to the implement for lateral adjustment with respect thereto and pivotally secured to the tractor drawbar, and means for adjusting a part of the implement about a transverse axis with respect to the draft frame, said adjusting means being mounted on the draft frame within reach of the tractor operator and being movable laterally with said draft frame.

6. An implement hitch comprising, in combination with a tractor having a rearwardly positioned drawbar and a rearwardly extending power take-off shaft, and an implement having a wheel supported main frame and in combination therewith a draft frame secured to the main frame for lateral adjustment with respect thereto, said draft frame being pivotally secured to the tractor drawbar, a supplemental frame pivotally mounted on a transverse axis on the main frame, and means mounted on the draft frame for adjusting the angular position of the supplemental frame, said means being movable laterally with the draft frame.

7. A device as set forth in claim 1, in which a driven shaft is mounted on the main frame and a driving shaft connected thereto and to the power take-off shaft is rotatably mounted on the draft frame.

8. A device as set forth in claim 1, in which the means for adjusting the supplemental frame comprises a lever arm extending upwardly from the supplemental frame, an adjustable lever pivotally mounted on the draft frame, and a link connecting said lever and the arm on the supplemental frame.

9. A drawbar for implements comprising a draft bar pivotally connected to the tractor at one end and pivotally connected on a vertical axis to an implement frame at its opposite end, a supplemental bar connected to the main bar and rigidly and adjustably secured to the main frame, a supplemental frame mounted on the main frame, a tilting lever extending upwardly from the supplemental frame, a tilting lever pivotally mounted on the draft bars and extending adjacent the operator's station on a tractor to which the draft bars are attached, and a link connecting said tilting lever to the tilting lever on the supplemental frame.

In testimony whereof I affix my signature.

BENJAMIN M. HYMAN